United States Patent [19]

Holland-Letz

[11] 4,435,245

[45] Mar. 6, 1984

[54] APPARATUS FOR IMPRINTING AND DISPENSING PRESSURE-SENSITIVE LABELS ADHERING TO A CARRIER TAPE

[75] Inventor: Günter Holland-Letz, Hirschhorn, Fed. Rep. of Germany

[73] Assignee: Esselte Pendaflex Corporation, Hirschhorn, Fed. Rep. of Germany

[21] Appl. No.: 463,312

[22] Filed: Feb. 2, 1983

Related U.S. Application Data

[63] Continuation of Ser. No. 254,296, Apr. 15, 1981, abandoned.

[30] Foreign Application Priority Data

May 9, 1980 [DE] Fed. Rep. of Germany ....... 3017843

[51] Int. Cl.[3] ......................... B41F 21/00; B41F 1/08; B32B 31/00

[52] U.S. Cl. .................................... 156/384; 156/541; 156/584; 156/DIG. 33; 101/292

[58] Field of Search ............... 156/542, 541, 387, 240, 156/584, 358, DIG. 33, DIG. 37, 384, 277, 540, 352, DIG. 28; 101/33, 292

[56] References Cited

U.S. PATENT DOCUMENTS 4,207,131 6/1980 Hamisch, Jr. ....................... 156/541
4,261,783 4/1981 Finke .................................. 156/542
4,316,759 2/1982 Becker et al. ....................... 156/542

*Primary Examiner*—Edward C. Kimlin
*Assistant Examiner*—Louis Falasco
*Attorney, Agent, or Firm*—Gerald J. Ferguson, Jr.; Joseph J. Baker

[57] ABSTRACT

Disclosed is an apparatus for imprinting and dispensing pressure-sensitive labels adhering to a carrier tape. The apparatus comprises an operating lever for controlling a printing mechanism and for controlling a feed means for stepwise drawing of the carrier tape over a platen and around a peel edge at which the pressure-sensitive labels detach from the carrier tape and move into a dispensing position. In the rest position of the operating lever the carrier tape is clamped by a braking means where the braking means is biased against the carrier tape by a spring. By means of a cam gearing arranged between the brake actuating member and the operating lever the brake actuating member can be pivoted against the bias of the spring from the carrier tape clamping position into a carrier tape release position when the operating lever has covered a part of its travel from the rest position into the operative position. An arresting means is provided which arrests the brake actuating member against the bias of the spring in the carrier tape release position. A member is also provided which releases the arresting member when the operating lever reaches its rest position so that the brake actuating member is immediately returned to the tape clamping position by the spring.

7 Claims, 4 Drawing Figures

APPARATUS FOR IMPRINTING AND DISPENSING PRESSURE-SENSITIVE LABELS ADHERING TO A CARRIER TAPE

This is a continuation of application Ser. No. 254,296, filed Apr. 15, 1981, abandoned.

BACKGROUND AND SUMMARY OF THE INVENTION

This invention relates to an apparatus for imprinting and dispensing pressure-sensitive labels adhering to a carrier tape comprising an operating lever which is pivotal from a rest position in which it holds a printing mechanism raised from a platen into an operating position in which it holds the printing mechanism bearing against the platen, a feed means for stepwise drawing of the carrier tape over the platen and a peel edge at which the pressure-sensitive labels detach from the carrier tape and move into a dispensing position, and a braking means for clamping the carrier tape with the pressure-sensitive labels adhering thereto on the path to the peel edge in the rest position of the operating lever.

Such an apparatus is known from DE-OS No. 2,518,782. In this known apparatus a pressure-sensitive label can be brought into the dispensing position by first squeezing and then releasing an operating lever. During the squeezing of the lever the label in the apparatus is provided with an imprint in that the printing mechanism is lowered by means of the printing mechanism lever onto the label disposed on the platen. The imprint may for example be a price or article number. On release of the operating lever the feed means engages the carrier tape and draws it an amount corresponding to the label length round the peel edge. When the carrier tape is drawn round the peel edge the label detaches and moves into the dispensing position beneath an applicator roll. The label can now be adhered to an article by rolling the applicator roll on said article. To prevent the carrier tape being pulled during the application of the label on the article due for instance to glue bridges or incomplete severing from the following label, the result of which would be that the following label would not assume the correct printing position on the platen, the brake means used in the known apparatus clamps the carrier tape on the way to the platen only when the operating lever assumes its rest position. As soon as the operating lever is squeezed against the grip of the apparatus the clamping action of the brake means is released so that the carrier tape can move.

If the operations necessary for applying the pressure-sensitive labels to articles, i.e. the squeezing and releasing of the operating lever and the subsequent rolling of the applicator roll with the resulting adhering of the label to the article, are carried out in rapid succession and possibly overlap, it frequently happens that the operating lever is squeezed against the apparatus grip again before the adhering of the label to the article is completely finished. This means that the brake means is released before the adhering operation of the label terminated. This has the undesirable result that the carrier band may be subsequently pulled so that the following label no longer assumes the correct printing position on the platen.

The problem underlying the invention is to further develop an apparatus of the type mentioned at the beginning so that a rapid succession of the operating steps necessary when using the apparatus is possible without the accuracy of the application of the imprint to the labels in the apparatus being impaired.

This problem is solved in that the braking means comprises a brake actuating member which is pressed positively into a carrier tape clamping position out of which said member is pivotal into a carrier tape release position, between the brake actuating member and the operating lever a cam gearing being disposed which is so constructed that the brake actuating member is pivoted out of the carrier tape clamping position into the carrier tape release position when the operating lever has covered a part of its travel from the rest position into the operative position, and an arresting means is provided which arrests the brake actuating member in the carrier tape release position and is released as soon as the operating lever reaches its rest position.

In the apparatus constructed according to the invention the carrier tape is clamped by the brake means not only in the rest position of the operating lever but is still clamped when the operating lever has already covered a portion of its total travel out of the rest position. Consequently, a subsequent pulling of the carrier tape and thus a displacement of the label disposed on the platen cannot take place even if the individual operations necessary for applying a label to an article are carried out in rapid succession or even overlap of if for some other reason the operating lever has been moved somewhat out of its rest position during the application of the label.

The invention will be explained by way of example with the aid of the drawings. FIGS. 1 to 4 show the apparatus according to the invention in four successive operating phases.

DETAILED DESCRIPTION OF THE INVENTION

Figure 1:
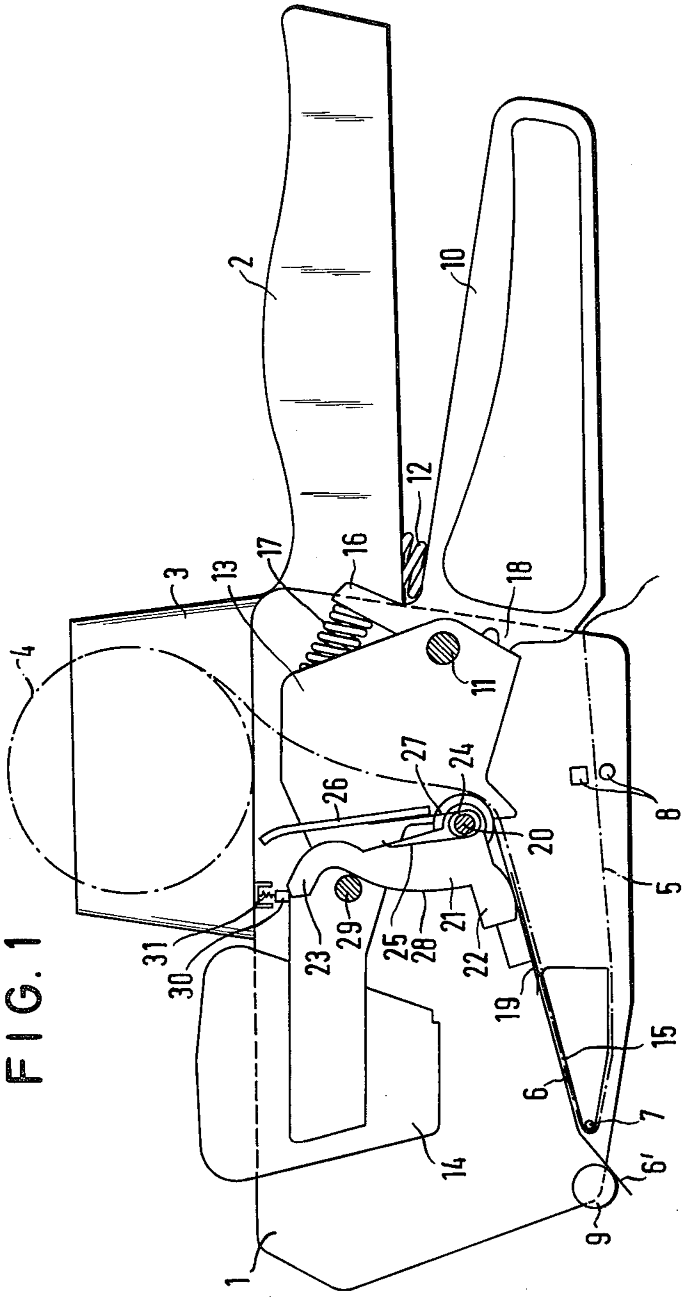
FIG. 1 is a schematic side view of an illustrative labeling, printing and dispensing apparatus in accordance with the invention, the operative components being shown in a first position during the operating cycle.

The apparatus illustrated in FIG. 1 is provided with a housing 1 on which a grip 2 is arranged. At the top of the housing there is a well 3 for accommodating a supply roll 4 of a carrier tape 5 with pressure-sensitive labels 6. The carrier tape 5 runs in the apparatus from the well 3 firstly downwardly and then forwardly to a peel edge 7 at which the carrier tape 5 is deflected and led past a feed means 8 to the housing rear end. Rotatably mounted in the housing in front of the peel edge 7 is an applicator roll 9 with which a label 6′ detached from the carrier tape and disposed in the dispensing position can be adhered to an article.

Beneath the grip 2 an operating lever 10 is disposed which is pivotally mounted about a shaft 11. Between the grip 2 and the operating lever 10 is a spring 12 which tends to press the lever continuously into the rest position illustrated in FIG. 1. In the housing 1 there is also a printing mechanism lever 13 which is also pivotally mounted about the shaft 11. Said printing mechanism lever 13 carries a printing mechanism 14 with the aid of which a pressure-sensitive label 6 disposed on a platen 15 can be imprinted. Between an arm 16 of the operating lever 10 and the printing mechanism lever 13 a spring 17 is disposed which serves to transmit a movement of the operating lever 10 directed towards the grip to the printing mechanism lever 13. In the rest position illustrated in FIG. 1 the printing mechanism lever 13 is held by a nose 18 on the operating lever 10 in the raised position.

On its way from the supply roll 4 to the platen 15 and the peel edge 7 the carrier band 5 is led beneath a brake plate 19 which is mounted pivotally about a shaft 20. Also pivotally mounted on said shaft is a brake actuating member 21 which has the form of an angle lever having an applicator arm 22 engaging the brake plate 19 and a locking arm 23 projecting generally upwardly in FIG. 1. Disposed on the shaft 20 is a spring 24 which in the illustration of FIG. 1 biases the brake actuating member 21 in the anticlockwise direction. For this purpose said spring 24 comprises a leg 25 in engagement with the brake actuating member 21 and a further leg 27 in engagement with a support surface 26 fixed with respect to the housing.

The brake actuating member 21 is provided with a control edge 28 which cooperates with a control member 29 formed by a roller on the printing mechanism lever 13 as will be explained in detail hereinafter. The brake actuating member 21, the control edge 28 formed thereon and the control member 29 form together a cam gearing. The locking arm 23 of the brake actuating member 21 cooperates with an arresting means 30 which is formed by a square shaft and which is so mounted that it can move in the vertical direction in the view of FIG. 1 being biased downwardly by a biasing spring 31. The arresting means is raised by the printing mechanism lever 13 against the force of the spring 31 when said lever assumes its rest position illustrated in FIG. 1. When the arresting means 30 is raised by the printing mechanism lever 13 the locking arm 23 of the brake actuating member 21 can pivot under the action of the spring 24 beneath the arresting means 30 so that the latter is held by the locking arm 23 in the raised position even when the printing mechanism lever 13 again moves downwardly.

For the following description of the mode of operation of the apparatus the rest position illustrated in FIG. 1 will first be considered. Due to the action of the spring 12 the operating lever 10 assumes here its lowermost position and the printing mechanism lever 13 is held by the nose 18 on the operating lever 10 so that the printing mechanism 14 is in its highest position. In this rest position the printing mechanism lever 13 also presses the arresting means 30 upwardly to such an extent that said arresting means does not prevent a rotation of the brake actuating member 21 under the action of the spring 24 in the anticlockwise direction.

The brake actuating member 21 is pivoted by the spring 24 so that the locking arm 23 has moved beneath the arresting means 30 and the applicator arm 22 thereof presses the brake plate 19 against the platen 15 into a carrier tape clamping position so that the carrier tape extending between the brake member 19 and the platen 15 is clamped.

For the description of the sequence of the individual movements in the actuation of the apparatus it will be assumed that no pressure-sensitive label is present in the dispensing position and that the next pressure-sensitive label is on the platen 15. The label 6′ illustrated in FIG. 1 is thus not present in this operating phase.

Figure 2:
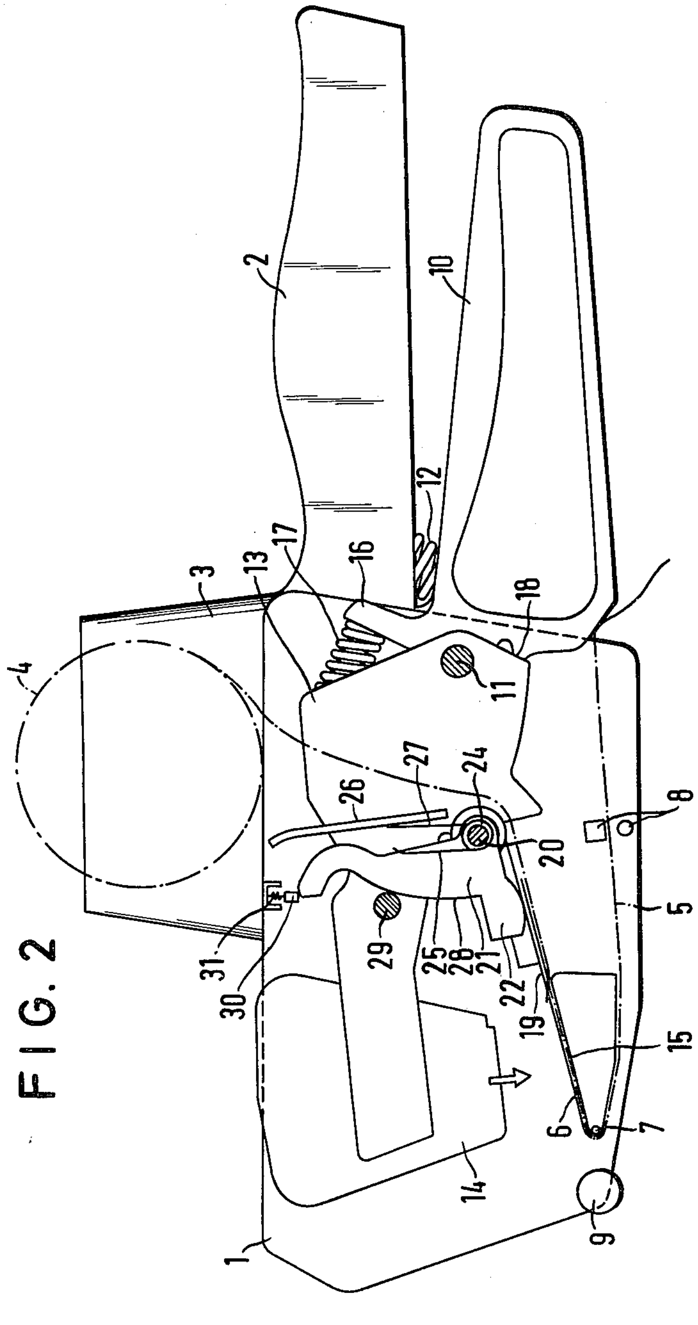
FIG. 2 is a view similar to FIG. 1 with the operative components being shown in a second position during an operating cycle.

If the operating lever 10 is now squeezed against the action of the spring 12 against the grip 2 this movement of the operating lever 10 anticlockwise is transmitted by means of the arm 16 and the spring 17 to the printing mechanism lever 13. The printing mechanism lever 13 thus also turns anticlockwise about the shaft 11 and thereby lowers the printing mechanism 14 in the direction towards the platen 15. In FIG. 2 the printing mechanism lever 13 and the printing mechanism 14 are shown on the way towards the platen 15. It is also apparent from FIG. 2 that the control member 29 is not yet touching the control edge 28 on the brake actuating member 21 so that the cam member 21 as before by means of its applicator arm 22 presses the brake plate 19 against the platen 15. This means that the carrier tape is still clamped against displacement. When the printing mechanism lever is further lowered due to the further pulling of the operating lever 10 against the grip 2 the control member 29 contacts the control edge 28 on the brake actuating member 21 so that the latter is pivoted against the action of the spring 24 clockwise into the carrier tape release position. As a result of this pivoting the applicator arm 22 lifts off the brake plate 19 and the locking arm 23 releases the path of the arresting means 30 downwardly. In the example of embodiment described the applicator arm 22 is raised when the operating lever 10 has covered a third of its travel from the rest position to the operating position.

Figure 3:
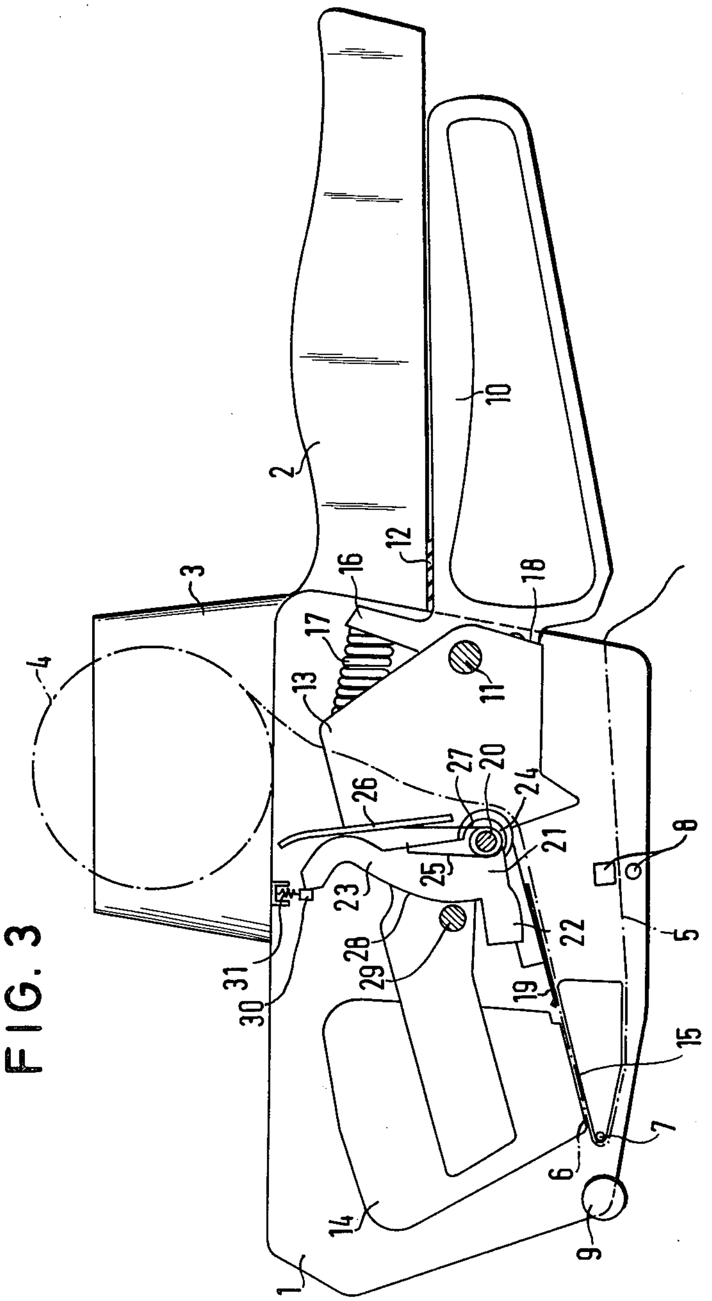
FIG. 3 is a view similar to FIGS. 1 and 2 with the operative components being shown in a third position during the operating cycle.

In FIG. 3 the printing mechanism lever 13 is shown in the completely lowered operating position in which the printing mechanism 14 produces an imprint on the label 6 disposed on the platen 15. The brake actuating member 21 is thereby pivoted in the clockwise direction into the release position so that the applicator arm 22 is raised from the brake plate 19. The arresting means 30 holds the brake actuating lever 21 in the pivoted position.

As apparent from the illustrations of FIGS. 1, 2 and 3 during the movement of the operating lever 10 against the grip 2 the transport means 8 has moved along the carrier tape in the direction towards the peel edge. During this movement the feed means is not in engagement with the carrier tape 5.

Figure 4:
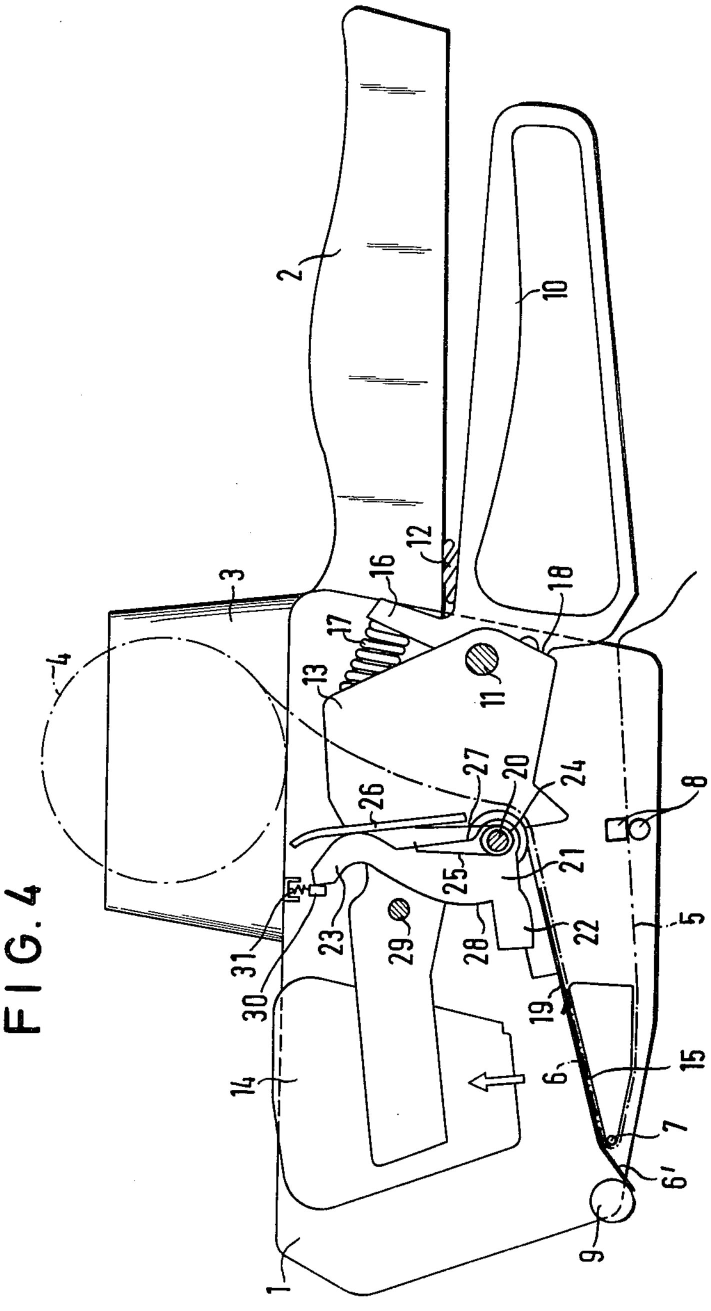
FIG. 4 is a view similar to FIGS. 1, 2 and 3 with the operative components being shown in a fourth position during the operating cycle.

When the operating lever 10 is released it is moved by the spring 12 out of the position illustrated in FIG. 3 into the position illustrated in FIG. 1 again. FIG. 4 shows the arrangement of the movable parts between the two end positions of the operating lever 10. As is apparent during the outwardly directed movement of the printing mechanism lever 13 the control member 29 is no longer in engagement with the control edge 28 on the brake actuating member 21 but the latter nevertheless cannot rotate under the action of the spring 24 clockwise because it is prevented from doing so by the arresting means 30. This means that the carrier tape in this operating phase is not clamped between the brake plate 19 and the platen 15. During the return movement of the operating lever 10 produced by the spring 12 the feed means 8 performs a movement from the position illustrated in FIG. 3 into the position illustrated in FIG. 1 but is now in firm engagement with the carrier tape 5 so that the latter is pulled a defined amount equal to the length of the pressure-sensitive label about the peel edge 7. As shown diagrammatically in FIG. 4 during this movement of the carrier tape 5 about the peel edge 7 a pressure-sensitive label detaches from the carrier tape 5 and moves into the dispensing position beneath the applicator roll 9. The carrier tape movement is not prevented by the brake plate 19 because as already mentioned in this operating phase said plate 19 is not pressed by the applicator arm 22 of the brake actuating member 21 against the platen 15.

Immediately before reaching the rest position illustrated in FIG. 1 the printing mechanism lever 13 strikes against the arresting means 30 and raises the latter to such an extent that it is no longer in engagement with the locking arm 23 of the brake actuating member 21. The brake actuating member 21 can therefore rotate anticlockwise under the action of the spring 24. Due to this rotation the applicator arm 22 of the member 21 again comes into engagement with the brake plate so that the carrier tape disposed therebelow is clamped on the platen.

The pressure-sensitive label 6' disposed in the dispensing position can now be adhered to an article by rolling the applicator roll 9 thereon. In this operating phase the significance of the brake means formed by the brake plate 19 and the brake actuating member 21 is apparent. On application of the pressure-sensitive label 6' disposed in the dispensing position to an article the label still adhering with the edge region to the carrier tape 5 must be detached completely from the carrier tape. It can happen that the label 6' disposed in the dispensing position is not completely severed from the next label 6 or that its glue layer is still connected to the glue layer of the next label so that on application of the dispensed label 6' to the article a tensile force is exerted on the carrier tape 5. If no brake means were present the carrier tape 5 could shift on the platen 15 so that the next label 6 to be imprinted would no longer be in the correct printing position.

The brake means described clamps the carrier band 5 not only during the application of the label 6' disposed in the dispensing position but is also operative during part of the movement of the operating lever 10 towards the grip 2 when the next printing and feeding operation is carried out. This has the advantageous effect that during the application of a pressure-sensitive label to an article the carrier tape is still securely clamped when the operating lever 10 is again being squeezed against the grip 2 for the next printing and feed operation. This makes rapid operation of the apparatus described possible and the operations of applying a label and actuating the lever 10 may even partially overlap without the carrier tape 5 being displaced on the platen. The label imprint can thus be made at the desired point of each label.

What we claim is:

1. In an apparatus for imprinting and dispensing pressure-sensitive labels adhering to a carrier tape comprising an operating lever which is pivotal from a rest position in which it holds a printing mechanism raised from a platen into an operating position in which it holds the printing mechanism bearing against the platen, a feed means for stepwise drawing of the carrier tape over the platen and a peel edge at which the pressure-sensitive labels detach from the carrier tape and move into a dispensing position, and a braking means for clamping the carrier tape with the pressure-sensitive labels adhering thereto on the path to the peel edge in the rest position of the operating lever, the improvement comprising the braking means including (a) a brake actuating member, (b) a spring which normally biases the brake actuating member into a carrier tape clamping position out of which said member is pivotal into a carrier tape release position, and (c) a cam gearing disposed between the brake actuating member and the operating lever, said cam gearing pivoting the brake actuating member out of the carrier tape clamping position against the bias of said spring into the carrier tape release position in response to the operating lever moving through a part of its travel from the rest position into the operating position, an arresting member which arrests the brake actuating member in the carrier tape release position against the bias of said spring and means for releasing the arresting member when the operating lever reaches its rest position so that the brake actuating member is immediately returned to said tape clamping position by said spring.

2. Apparatus as defined in claim 1 wherein the cam gearing comprises a control edge on the brake actuating member and a control member engaging on the control edge in dependence upon the movement of the operating lever.

3. Apparatus as defined in claim 2 wherein the control member is disposed on a printing mechanism lever which is actuated by the operating lever and which carries the printing mechanism.

4. Apparatus as defined in claim 3 wherein the brake actuating member comprises an applicator arm for clamping the carrier tape and a locking arm adapted to be brought into engagement with the arresting means.

5. Apparatus as defined in claim 4 wherein between the applicator arm of the brake actuator member the platen a brake plate is provided which in the carrier tape clamping position of the brake actuating member is pressed by the applicator arm thereof for clamping the carrier tape led over the platen against said platen.

6. Apparatus as defined in claim 4 wherein the arresting member comprises a spring-loaded square shaft which is disposed in the pivot region of the locking arm of the brake actuating member and in the rest position of the operating lever is held by the print mechanism lever against the spring loading out of the pivot region of the locking arm.

7. Apparatus as defined in claim 1 wherein the part of the travel which the operating lever covers until the start of the pivoting of the brake actuating member from the carrier tape clamping position into the carrier tape release position is about one third of its entire travel from the rest position to the operating position.

* * * * *